United States Patent Office 3,383,434
Patented May 14, 1968

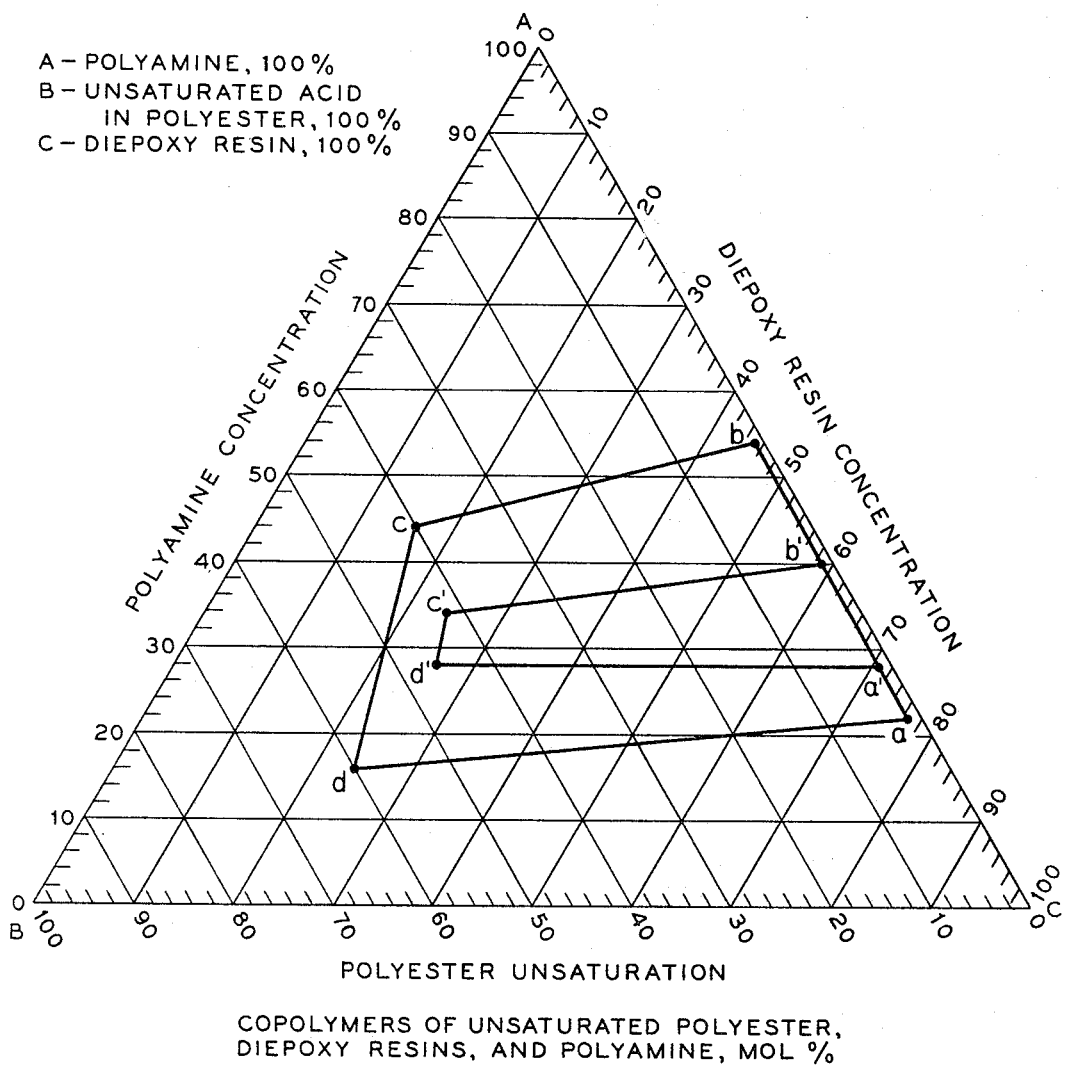

3,383,434
COPOLYMERIZATION OF UNSATURATED POLYESTERS, EPOXIDE RESINS, AND POLYAMINES
Earl F. Carlston, El Cerrito, Calif., assignor to Chevron Research Company, a corporation of Delaware
Continuation-in-part of application Ser. No. 120,780, June 29, 1961. This application June 24, 1965, Ser. No. 466,608
20 Claims. (Cl. 260—835)

ABSTRACT OF THE DISCLOSURE

Novel copolymerized resin compositions are prepared by reacting a diepoxide resin having an epoxy equivalent between about 175 and 1150, an unsaturated polyester having an acid number below about 50, and an epoxy resin-curing polyamine which has two primary amino groups or which is piperazine.

This application is a continuation-in-part of application Ser. No. 120,780, filed June 29, 1961, now abandoned.

The present invention relates to novel polymerizable, curable, artificial, resinous compositions; to the cured, infusible compositions produced therefrom; and to methods for their preparation. More particularly, the compositions of the present invention are based on a copolymerizable mixture of unsaturated polyesters of the maleic acid-ethylene glycol type, epoxide resins, and a primary diamine. In general, the present compositions have the desirable properties usually associated with the epoxide resin, and have the advantage that they form better adhesives, give a more versatile range of products, and are less costly due to the presence of less expensive polyester. Accordingly, they are useful in such applications as adhesives, laminates, castings, and surface coatings.

In accordance with the present invention, complex copolymers having superior properties can be formed expeditiously by reacting at relatively low temperatures (1) unsaturated polyester containing ethylenic unsaturation due to the polyesterification of an alpha-beta ethylenic, alpha-beta dicarboxylic acid or anhydride, such as fumaric acid, maleic acid, or maleic anhydride, and a glycol, such as diethylene glycol; (2) a diepoxide resin derived from epichlorohydrin and a dihydric phenol containing two phenolic hydroxyl groups; and (3) an epoxy-curing polyamine, such as piperazine, or one having two primary amino groups, that is, two nitrogen atoms having attached thereto two hydrogen atoms, such as metaxylylene diamine or hexamethylene diamine.

It is well known that polyamines react with epoxide resins. However, it is surprising that the specified polyamine when added to a liquid mixture of unsaturated polyester and epoxide at low temperatures will react rapidly to give thermoset plastics. Reaction occurs with the C=C bond contained in the unsaturated polyester, as well as with the epoxy groups. The polyamine thus acts as a cross-linking agent for the polyester and as curing agent for the epoxide resin to form a complex copolymer.

Ordinarily, unsaturated polyesters are cross-linked with an unsaturated monomeric substance, such as styrene, by means of an addition polymerization reaction occurring between reactive double bonds, the reaction being expedited by the use of catalyst and accelerator agents.

In accordance with the invention, unsaturated monomer and associated agents need not be used, since the polyamine takes their place and performs the dual function of cross-linking the unsaturated polyester and of curing the epoxy resin. In essence, then, the sole chemical reactants of the present invention are the components of epoxy resin, unsaturated polyester and polyamine. The resulting reaction product, if desired, can be formed into mixtures or compositions with inert substances, such as fillers or pigments, in physical association.

The epoxy component of the present invention is generally defined as being a complex polyether containing an epoxy group at both ends of the chain, derived from a dihydric phenol containing not more than two phenolic hydroxyl groups. These ethers are linear polymers which can be obtained by condensing, in the presence of caustic alkali, an epoxide such as epichlorohydrin, with the phenolic compound, the most widely known being the diglycidyl polyethers of bis-(4-hydroxyphenyl)-2,2-propane, or bisphenol-A, and having the formula:

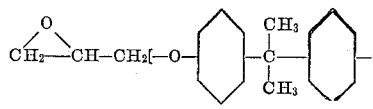 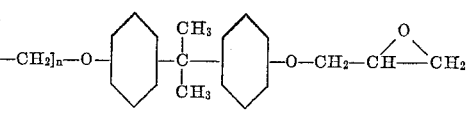

Polymers of different molecular weights can be obtained by varying the proportions of reactants, and the epoxides herein contemplated are those which are either viscous liquids or low melting point solids and are soluble in a number of solvents, e.g., ketones, chlorinated hydrocarbons, glycol ethers, aromatic hydrocarbons, such as xylene and toluene, etc. Thus, those epoxides are contemplated which are normally liquid or capable of being rendered liquid by warming or mixing with a solvent, so that the mixture of polyester and epoxide resin is liquid. In general, suitable polyethers are those in which $n$ above ranges from 0 to 7, indicating molecular weights of approximately 350 to 2,300. Or in other words, suitable epoxy compounds are those having epoxy equivalents ranging from 175 to 1,150, preferably 175 to 300, obtained by dividing the molecular weight by the number of epoxy groups in the molecule.

In addition to bisphenol-A above-mentioned, other dihydric phenols, and indeed mononuclear polyhydric phenols, are suggested as suitable materials for the preparation of epoxy resins. Among the mononuclear phenols may be mentioned resorcinol, catechol, hydroquinone, and tertiarybutyl catechol. However, the polynuclear phenols wherein the nuclei are attached to an intermediate hydrocarbon group are preferred, and in addition to bisphenol-A, that is, bis-(4-hydroxyphenyl)-2,2-propane, there may be mentioned 4,4'-dihydroxy benzophenone, bis(4-hydroxyphenyl)-1,1-ethane, bis(4-hydroxyphenyl)-1,1-isobutane, bis(4-hydroxyphenyl)2,2-butane, bis(4-hydroxy-2-methyl-phenyl)-2,2-propane, and bis(2-dihydroxynaphthyl)methane.

Similarly, in addition to the preferred epichlorohydrin, there can be employed other epihalohydrins or other halogen-substituted epoxy compounds, such as 1-chloro-2,3-epoxybutane, 1-chloro-3,1,4-epoxybutane; 2-chloro-3,4-epoxybutane; 1-bromo-2,3-epoxypentane; 2-chloromethyl 1,2-epoxybutane; 4-chloro-2-methyl-2,3-epoxypentane; and 1-chloro-2,3-epoxy octane.

As is well known, some of the epoxide resins enumerated above are available commercially and are sold under trade names such as Epon, Araldite, Epi-Rez and Bakelite epoxide and the Dow epoxy resins (DER).

The commercial resins listed above are derived from epichlorohydrin and bisphenol-A, and are chiefly characterized by the specification "Epoxide Equivalent Weight." Thus, DER has an epoxide equivalent weight within the range 173–210, while the other resins have an equivalent weight within the range 175–4000.

A further discussion of these resins may be obtained from the book, "Epoxy Resins," by Irving Skeist and George R. Somerville, pages 18 and 19, Reinhold Publishing Corporation, New York, first published in 1958, third printing in 1960.

While metaxylylene diamine and hexamethylene diamine are the preferred polyamines, in general polyamines which are curing agents for epoxide resins can be employed. These include certain secondary diamines, such as piperazine; primary diamines, and polyamines having two primary amino groups and one or more secondary amino groups. The polyamines can be aromatic, aliphatic, alicyclic, and heterocyclic in nature. In addition to the preferred metaxylylene diamine and hexamethylene diamine, other examples are metaphenylene diamine, diethylene triamine, ethylene diamine, and triethylene tetramine.

In the formulation of the compositions herein contemplated, the proportions of unsaturated polyester and epoxide compound can range from as little as 2 mol percent polyester to about 70 mol percent polyester based on 100 mols of the two. Theoretically, the amount of polyamine reaches the maximum when enough polyamine is present to provide active hydrogen to saturate the C=C bond of the polyester and to react with the epoxy rings of the epoxide. For example, this amount may be determined by the equation $$M = \frac{X}{2} + \frac{Y}{4}$$

where M represents mols of diamine; X, mols of diepoxide resin; and Y, mols of unsaturated acid in the polyester.

In practice, the amount of diamine may vary from the theoretical value as determined by the above equation. Accordingly, the proportions in mols of polyester, polyamine, and epoxide can be selected from the area defined by the points $a$, $b$, $c$, and $d$ of the annexed triangular coordinate graph, a still more preferred area being that defined by the points $a'$, $b'$, $c'$, and $d'$. The proportions of polyester are computed on the basis of degree of unsaturation in the polyester, i.e., mols of polyester are equivalent to mols of unsaturation of C=C bonds in the polyester. In other words, the mols of polyester are generally equivalent to the number of mols of unsaturated acid employed in the preparation of the polyester. Referring to the graph, it will be noted that compositions can be selected within the graph containing 16 mol percent $d$ to 54 mol percent $b$, preferably 28 mol percent $d'$ to 40 mol percent $b'$ polyamine; about 1 mol percent $b$ to 60 mol percent $d$, preferably 1.5 mol percent $b'$ to 46 mol percent $d'$ polyester; and 16 mol percent $c$ to about 76 mol percent $a$, preferably 24 mol percent $c'$ to 70 mol percent $a'$ epoxide. Compositions prepared in accordance with the invention vary from hard, tough copolymers to tough, flexible copolymers.

The unsaturated polyester is prepared in conventional fashion. Accordingly, the reaction can be carried out at temperatures of about 150° C. to 250° C. in an atmosphere of inert gas, such as nitrogen or carbon dioxide, water formed during reaction being removed by distillation. If desired, the esterification reaction may be catalyzed by acids or acid salts, soluble in the reaction mixture, for example, p-toluene sulfonic acid. Premature cross-linking of the double bonds during esterification and, consequently, gelation may be obviated by the use of inhibitors, such as hydroquinone, resorcinol, pyrogallol, tertiary butyl catechol, phenylene diamines, aniline, benzaldehyde, or ascorbic acid. While in general equimolecular proportions of glycol and dibasic acid can be employed, a slight stoichiometric excess of glycol, from 3 to 10 mol percent over total acid material, is preferably employed to compensate for loss of glycol material during reaction. The extent of reaction can be followed by acid number determinations (acid number being defined as the number of milligrams of potassium hydroxide equivalent to the free acid in one gram of resin), and by viscosity determinations in an appropriate solvent, in common practice acid number determinations alone being satisfactory where the manufacturing process has been standardized. In general, polyesterification is conducted to a resin of acid number below 50, and preferably below 30. In other words, the polyester component has a number average molecular weight in the range 1,000 to 3,000, preferably around 2,000–3,000. (Principles of Polymer Chemistry, pp. 273 et seq., Paul J. Flory, Cornell University Press, Ithaca, New York, 1953.) As with the epoxides, the polyester component is one which is liquid or can be rendered liquid by warming or by the use of solvents, such as those enumerated for the epoxide component.

The unsaturated polyester may be derived in the manner described above by reacting appropriate amounts of an aliphatic glycol, such as ethylene glycol, and of an unsaturated aliphatic dicarboxylic acid, such as maleic acid or its anhydride. In addition to ethylene glycol, other glycols may be employed including diethylene glycol, triethylene glycol, 1,3-trimethylene glycol, 1,2-propylene glycol, dipropylene glycol, butylene glycol, styrene glycol, halogen-substituted glycols of the above, polyethylene glycol, tetramethylene glycol, pentamethylene glycol, hexamethylene glycol, octamethylene glycol, tetraethylene glycol, and xylylene diol. As is known in the art, the reactive double bond in the unsaturated polyester can be contributed to by the use of unsaturated glycols, such as 2-butene-1,4-diol, 2,5-dimethyl 3-hexene-2,5-diol or 3,6-dimethyl 4-octene-3,6-diol. In general, however, because of economics it is preferred to use an unsaturated dibasic acid as the source of the reactive double bond.

In place of maleic acid, other unsaturated diacids can be employed, such as fumaric acid, mesaconic acid, citraconic acid, ethyl maleic acid, chloromaleic acid, bromomaleic acid, chlorofumaric acid, and bromofumaric acid.

Further, as known in the art, the unsaturated polyester can be desirably modified by replacing part of the ethylenically unsaturated dibasic acid with other aromatic and aliphatic acids free of ethylenic unsaturation. Examples of such acids which can be employed in mol ratios thereof to unsaturated acid ranging from 1:3 to 1:1 are phthalic acid, isophthalic acid, terephthalic acid, tetrachlorophthalic acid, succinic acid, adipic acid, suberic acid, azelaic acid, dimethyl succinic acid, oxalic acid, malonic acid, glutaric acid, pimelic acid, biphenyldicarboxylic acid, naphthalene dicarboxylic acid, cyclohexane dicarboxylic acid, pyrotartaric acid, and sebacic acid.

In the examples that follow, the practice of the invention is illustrated. As indicated above, products of varying properties can be obtained in the practice of the invention by varying the proportions of ingredients. Thus, hard, tough compositions suitable in molding and casting operations, to tough, flexible compositions suitable in adhesive and surface coating applications can be prepared.

The polyesters A and B used in the examples were prepared as follows:

Polyester A

Maleic anhydride, 1,470 g. (15 mols), and diethylene glycol, 1750 g. (16.5 mols), were placed in a 5-liter 3-necked flask equipped with a stirrer, a nitrogen inlet tube, thermometer, and a reflux condenser. The reflux condenser was jacketed with boiling water and was used to separate steam and glycol and to return the glycol to the reaction zone. The ingredients were allowed to react for four hours at 200° C. with vigorous stirring and a high rate of nitrogen sparge. After four hours a total of 250 ml. of water had been removed and the acid number was 23.

The polyester was removed from the flask and allowed to cool at room temperature. It has a viscosity of 340 poises at 25° C.

Polyester B

This polyester was prepared essentially in the same manner as Polyester A, except that there were employed maleic anhydride, 980 g. (10 mols), and adipic acid, 730 g. (5 mols). The amount of water removed during reaction was 350 ml. and the acid number at the end of the run was 22. Viscosity at 25° C. was 150 poises.

The copolymers of the examples are prepared by the following general procedure:

In an open vessel at room temperature, there are placed diepoxy resin and unsaturated polyester in the indicated parts by weight. These materials are well mixed by stirring, after which the diamine is added with additional stirring. A portion of the resulting mixture is poured into a 3⅛ inch diameter aluminum cup to a depth of ⅜-inch. The material is allowed to gel at room temperature. Hardness is measured by the method of ASTM 1706–59T (Shore hardness) at 100° C., a Shore hardness of 80° or more indicating a very hard, tough resin. In the experiments tabulated in Table I the effect of varying the epoxide:polyester ratio, by weight, is shown. It will be noted that the hardness, both Shore and Barcol, of the copolymers decreases as the concentration of the polyester increases.

TABLE I

| Experiment No. | Parts MXDA [1] | Parts DER 331 [2] | Parts Polyester A | Shore Hardness | Barcol Hardness |
| --- | --- | --- | --- | --- | --- |
| 1 | 17 | 71 | 12 | 90 | 30 |
| 2 | 17 | 62 | 21 | 85 | 27 |
| 3 | 17 | 42 | 41 | 82 | 23 |
| 4 | 17 | 34 | 49 | 80 | 20 |
| 5 | 17 | 30 | 53 | 75 | [3] |
| 6 | 17 | 21 | 62 | 70 | [3] |

[1] MXDA = metaxylylene diamine.
[2] DER 331 is a diepoxide resin having an epoxy equivalent of 188, and a viscosity of about 120 poises at 25° C.
[3] Too soft to measure.

As will be shown, the ingredients of the copolymers herein contemplated may be mixed at room temperature and then allowed to react at this temperature. No external source of heat is necessary to gel or cure the compounds. The three components when mixed at room temperature react exothermically, the maximum temperature reached being called the peak exotherm. The peak exotherm has an effect on final product. In cases of high peak exotherm, the products obtained are not only subject to crazing but are also characterized by a higher degree of shrinkage than those compounds with a lower peak exotherm. Products obtained in accordance with the invention generally have low peak exotherms. While reaction can take place at room temperatures around 25° C., if desired, the curing reaction can be expedited by heating, for example, to temperatures of 100° C. The rate at which the heat evolves is an indication of the rate of reaction. Therefore, the time required for the temperature to reach a given point, conveniently 100° C., is a measure of the rate of reaction.

In addition to lower peak exotherms and consequent less shrinkage, the compositions herein contemplated have a shorter cure time than that of diepoxide alone. Another advantage is the improved appearance of the surfaces of moldings and coatings exposed to air. Polyamines, such as metaxylylenediamine and other polyamine epoxy-curing agents, react with the carbon dioxide of the air to form insoluble carbonate which appears as a scum on the surface of epoxy coatings and castings made without the polyester. Carbonate formation is reduced as the proportion of unsaturated polyester in the present compositions is increased.

Tabulated examples 7–12 of Table II show the effect of varying diamine proportions at a constant epoxide:polyester ratio. Examples 8–11, wherein the diamine was employed in proportions falling within the area A', B', C', and D' of the graph, give rise to harder compositions than those of Examples 7 and 12 wherein the diamine proportion is outside the preferred range.

TABLE II

| Experiment No. | Grams MXDA | Grams DER 331 | Grams Polyester A | Shore Hardness |
| --- | --- | --- | --- | --- |
| 7 | 10 | 45 | 45 | 75 |
| 8 | 13 | 43½ | 43½ | 80 |
| 9 | 17 | 41½ | 41½ | 82 |
| 10 | 20 | 40 | 40 | 83 |
| 11 | 23 | 38½ | 38½ | 80 |
| 12 | 26 | 37 | 37 | 75 |

In the preparation of copolymers of the present invention, unexpectedly short gel times and low peak exotherms prevail. The time to gel is markedly decreased as the amount of polyester in the epoxy resin is increased. At the same time the maximum temperature reached during cure is considerably less than that of epoxy resin and diamine without the polyester. This is shown in Examples 13–15.

EXAMPLE 13

Diepoxy resin DER 331, 100 g., and metaxylylene diamine, 18 g., were well mixed and poured into an aluminum cup. A thermocouple was inserted in the center of the gelling mass. After 85 minutes the temperature had reached a value of 100° C. The peak exotherm temperature was 235° C.

EXAMPLE 14

This example was carried out essentially as Example 13, except that 98 g. of DER 331 epoxide and 2 g. of Polyester A were mixed prior to adding 18 g. of metaxylylene diamine. This mixture required 50 minutes to reach 100° C., as compared with 85 minutes of Example 13.

EXAMPLE 15

Essentially the same procedure as in Example 13 was followed, except that 50 g. of DER 331 epoxide and 50 g. of Polyester A were mixed prior to adding 18 g. of metaxylylene diamine. In this case, only seven minutes were required to reach 100° C., and the peak exotherm was 160° C.

As the concentration of maleic acid in the polyester decreases, such as by its partial replacement with a saturated acid, e.g., adipic, time to 100° C. increases and the peak exotherm becomes lower. They are all faster, however, than diepoxide without polyester. This is shown in Examples 16–18.

EXAMPLE 16

This example was carried out in essentially the same manner as Example 15, except that Polyester B was substituted for Polyester A, and 14.5 g. of metaxylylene diamine was added to effect cure. In this case, 17 minutes were required to reach 100° C., and the peak exotherm was 125° C.

The operability of diamines, other than metaxylylene diamine, which are also suitable in curing epoxy resins, is shown in Examples 17–18.

EXAMPLE 17

The procedure of Example 16 was followed, except that 8.8 g. of diethylene triamine was employed in place of the metaxylylene diamine. The time to 100° C. was 4 minutes, and the peak exotherm 125° C.

EXAMPLE 18

Example 16 was repeated except that 12.5 g. of hexamethylene diamine was employed in place of the metaxylylene diamine. The time to 100° C. was seven minutes and peak exotherm 135° C.

The following example shows the use of a solvent in forming the copolymers herein contemplated.

EXAMPLE 19

In an open vessel, parts being by weight, there were placed 50 parts of Polyester B, 50 parts of DER 331 epoxy resin, and 25 parts xylene. After thorough mixing, 14.5 parts of metaxylylenediamine were added to the solution and mixed. The mixture was applied as a coating and gelation occurred at room temperature in about six hours. The initial viscosity of the solution was 2.5 poises at 25° C. and viscosity slowly increased until gelation. Solvent loss, measured at 30° C. was 65 percent after 10 hours, 70 percent after 20 hours, and 85 percent after 80 hours.

That monoamines are inoperative to give the results herein contemplated is shown in Example 20.

EXAMPLE 20

(a) Polyester A, 51 g., DER 331 epoxy resin, 49 g., and metaxylylene diamine, 17.6 g. were thoroughly mixed at room temperature. The mixture gelled rapidly showing rapid cure or cross-linking.

(b) In place of metaxylylene diamine of (a), an equivalent amount, namely 27.7 g., of benzylamine was used. This mixture did not gel at room temperatures. The mixture was then heated to 100° C., whereupon the mixture slowly gelled. However, the resulting product was rubbery at room temperature as compared with the tough, unyielding product of (a).

The bisphenol-epichlorohydrin diepoxide resin can be replaced by an amount of vinyl cyclohexene dioxide ranging from about 5 percent up to about 50 percent, by weight. Whereas, without unsaturated polyester, the mixture of diepoxides cures very slowly with a polyamine, cure time in the presence of the polyester is very fast. This is illustrated in Examples 21 and 22.

EXAMPLE 21

Parts being by weight, 50 parts DER 331 epoxy resin, 50 parts vinyl cyclohexene diepoxide, and 31.5 parts metaxylylenediamine were intimately mixed at room temperature. The mixture was still a liquid after 8 hours, and did not shown any exothermic temperature rise.

EXAMPLE 22

Parts being by weight, 50 parts Polyester A, 25 parts vinyl cyclohexene dioxide, 25 parts DER 331 epoxy resin, and 24 parts metaxylylene diamine were intimately mixed at room temperatures. Gel time was 2 minutes; time to 100° C., 4 minutes; and peak exotherm, 180° C.

As indicated earlier, the compositions herein contemplated are useful in adhesive applications. Surprisingly it has been found that the property of adhesion possessed by compositions prepared in accordance with the invention is far superior to that of polyester and epoxy resin, taken singly. To show this unexpected phenomenon the following adhesion test was performed:

Two discs of steel, 1 inch diameter and ⅜ inch thick, were cleaned and abraded on one side by rubbing them on coarse emery cloth. One drop of the resin to be tested was placed on the center of one disc, and the other disc was placed on top. The weight of the disc was sufficient to cause the resin to flow evenly over the entire surface. Excess resin oozed out and drained away. The discs were placed on a level spot while the resin polymerized. Cure time was one week at room temperature plus one hour at 100° C. Tests of adhesive strength were performed on an Instron Tensile Testing Instrument. The discs were pulled apart with the aid of screw eyes screwed into the backs of the discs.

Tabulated below are the compositions compared, parts being by weight, and the results obtained:

| Resin: | Pounds of Pull Required to break bond |
|---|---|
| 1. Epoxy resin (DER 331), 10 parts; MXDA[1], 1.8 parts | 1700 |
| 2. Polyester B, 2 parts; Epoxy resin (DER 331), 8 parts; MXDA, 1.7 parts | 1940 |
| 3. Polyester B, 10 parts; MXDA, 2.2 parts | 380 |

MXDA[1] = Methaxylylene diamine.

It will be noted that the adhesive effect of the present compositions (Resin 2) contrary to expectations is more than either polyester or epoxide alone.

I claim:

1. Process for preparing a resinous composition which comprises forming a liquid mixture consisting essentially of (a) a diepoxide obtained by the reaction of an epihalohydrin and a dihydric phenol containing two phenolic hydroxyl groups, said diepoxide resin having an epoxy equivalent between about 175 and 1,150; and (b) an unsaturated polyester obtained by the esterification of glycol with an acid-reacting material selected from the group consisting of alpha-beta ethylenically unsaturated dicarboxylic acids and their anhydrides, said unsaturated polyester having an acid number below about 50; then reacting with said liquid mixture as the sole curing agent an epoxy resin-curing polyamine which has two primary amino groups or which is piperazine, in sufficient quantity to react with substantially all of the unsaturated polyesters and the diepoxides; wherein the proportions, based on the total moles of diepoxide, unsaturated polyester and polyamine present, may range from 16 to 76 mole percent of diepoxide, from 1 to 60 mole percent of unsaturated polyester and from 16 to 54 percent of polyamine and being within the area defined by $a$, $b$, $c$ and $d$ of the annexed drawing.

2. Process according to claim 1 wherein the diepoxide is diglycidyl polyester of bis-(4-hydroxyphenyl)-2,2-propane.

3. Process according to claim 1 wherein the proportions, based on the total moles of diepoxide, unsaturated polyester and polyamine present, may range from 24 to 70 mole percent of diepoxide, from 1.5 to 46 mole percent of unsaturated polyester and from 28 to 40 percent of polyamine and being within the area defined by $a'$, $b'$, $c'$, and $d'$ of the annexed drawing.

4. Process according to claim 1 wherein the polyamine is metaxylylene diamine, hexamethylene diamine or diethylene triamine.

5. Process according to claim 1 wherein the polyamine is metaxylylene diamine.

6. Process according to claim 1 wherein the diepoxide is replaced by 5 to 50 percent by weight with vinyl cyclohexene dioxide.

7. Process according to claim 3 wherein the polyamine is metaxylylene diamine, hexamethylene diamine, and diethylene triamine.

8. Process for preparing a resinous composition which comprises forming a liquid mixture consisting essentially of (a) a diepoxide of epichlorohydrin and a dihydric phenol containing two phenolic hydroxyl groups, said diepoxide having an epoxy equivalent between about 175 and 1,150; and (b) an unsaturated polyester obtained by the esterification to an acid number below 50 of glycol, of ethylenic acid-reacting material selected from the group consisting of ethylenically unsaturated alpha-beta dicarboxylic acids and their anhydrides, and of aromatic and aliphatic dicarboxylic acids free of ethylenic unsaturation in mol ratios to said ethylenic unsaturated acid reaction material ranging from 1:3 to 1:1; then reacting with said liquid mixture as the sale curing agent an epoxy resin-curing polyamine which has two primary amino groups or which is piperazine, in sufficient quantity to react with substantially all of the unsaturated polyesters and the diepoxides; wherein the proportions, based on the total moles of diepoxide, unsaturated polyester and polyamine present, may range from 16 to 76 mole percent of diepoxide, from 1 to 60 mole percent of unsaturated polyester and from 16 to 54 percent of polyamine and being within the area defined by $a$, $b$, $c$ and $d$ of the annexed drawing.

9. Process according to claim 8, wherein the proportions, based on the total moles of diepoxide, unsaturated polyester and polyamine present, may range from 24 to 70 mole percent of diepoxide, from 1.5 to 46 mole percent of unsaturated polyester and from 28 to 40 percent of polyamine and being within the area defined by $a'$, $b'$, $c'$, and $d'$ of the annexed drawing.

10. Process according to claim 9, wherein the dihydric phenol is bis-(4-hydroxyphenyl)-2,2-propane and the polyamine is metaxylylene diamine, hexamethylene diamine or diethylene triamine.

11. Process according to claim 10 wherein the polyamine is metaxylylene diamine.

12. Resin composition consisting essentially, as the sole chemical reactants, of (1) a diepoxide obtained by the reaction of epichlorohydrin and a dihydric phenol containing two phenolic hydroxyl groups and having an epoxy equivalent between about 175 and 1,150; (2) an ethylenic unsaturated polyester obtained by the esterification of glycol with an acid-reacting material selected from the group consisting of ethylenically unsaturated, alpha-beta dicarboxylic acids and their anhydrides, said polyester having an acid number below 50; and (3) an epoxy resin-curing polyamine agent which has two primary amino groups or which is piperazine; the proportions, based on the total moles of diepoxide, unsaturated polyester and polyamine present, may range from 16 to 76 mole percent of diepoxide, from 1 to 60 mole percent of unsaturated polyester and from 16 to 54 percent of polyamine and being within the area defined by $a$, $b$, $c$ and $d$ of the annexed drawing.

13. Composition according to claim 12 wherein the diepoxide is mixed with vinyl cyclohexene dioxide in an amount of 5 to 50 percent by weight of the diepoxide.

14. Composition according to claim 12 wherein the acid reacting material is maleic acid, and the dihydric phenol is bis-(A-hydroxyphenyl)-2,2-propane.

15. Composition according to claim 14 wherein the polyamine is metaxylylene diamine, hexamethylene diamine, or diethylylene triamine.

16. Composition according to claim 15 wherein the proportions, based on the total moles of diepoxide, unsaturated polyester and polyamine present, may range from 24 to 70 mole percent of diepoxide, from 1.5 to 46 mole percent of unsaturated polyester and from 28 to 40 percent of polyamine and being within the area defined by $a'$, $b'$, $c'$, and $d'$ of the annexed graph.

17. Composition according to claim 16 wherein the polyamine is metaxylylene diamine.

18. Resin composition consisting essentially, as the sole chemical reactants, of (1) diepoxide obtained by the reaction of epichlorohydrin and a dihydric phenol containing two phenolic hydroxyl groups and having an epoxy equivalent in the range 175 to 1,150; (2) an ethylenic unsaturated polyester obtained by the esterification of glycol with acid-reacting material (a) selected from the group consisting of alpha-beta ethylenic, alpha-beta dicarboxylic acids and their anhydrides, and (b) dicarboxylic acids free from ethylenic unsaturation selected from the group consisting of aromatic and aliphatic acids, the mol ratio of (b) to (a) being within the range 1:3 to 1:1; and (3) an epoxy resin-curing polyamine which has two primary amino groups or which is piperazine; the proportions, based on the total moles of diepoxide, unsaturated polyester and polyamine present, may range from 16 to 76 mole percent of diepoxide, from 1 to 60 mole percent of unsaturated polyester and from 16 to 54 percent of polyamine and being within the area defined by $a$, $b$, $c$ and $d$ of the annexed drawing.

19. Composition according to claim 18 wherein the polyamine is metaxylylene diamine, the acid-reacting material is maleic anhydride and adipic acid, and the dihydric phenol is bis-(4-hydroxyphenyl)-2,2-propane.

20. Composition according to claim 18 wherein the proportions, based on the total moles of diepoxide, unsaturated polyester and polyamine present, may range from 24 to 70 mole percent of diepoxide, from 1.5 to 46 mole percent of unsaturated polyester and from 28 to 40 percent of polyamine and being within the area defined by $a'$, $b'$, $c'$, and $d'$ of the annexed drawing.

References Cited

UNITED STATES PATENTS

| 2,885,380 | 5/1959 | Elarde | 260—835 |
| 2,965,602 | 12/1960 | Hicks | 260—835 |
| 3,046,851 | 7/1962 | Vries | 260—835 |

MURRAY TILLMAN, *Primary Examiner.*

G. F. LESMES, *Examiner.*

P. LIEBERMAN, *Assistant Examiner.*

UNITED STATES PATENT OFFICE

CERTIFICATE OF CORRECTION

Patent No. 3,383,434                                  May 14, 1968

Earl F. Carlston

It is certified that error appears in the above identified patent and that said Letters Patent are hereby corrected as shown below:

Column 5, line 7, "at room temperature. It has" should read -- to room temperature. It had --. Column 7, line 47, "shown" should read -- show --. Column 8, line 40, "polyester" should read -- polyether --; line 73, "sale" should read -- sole --.

Signed and sealed this 16th day of December 1969.

(SEAL)
Attest:

Edward M. Fletcher, Jr.                    WILLIAM E. SCHUYLER, JR.
Attesting Officer                              Commissioner of Patents